US011961964B2

(12) United States Patent
Okayama et al.

(10) Patent No.: US 11,961,964 B2
(45) Date of Patent: Apr. 16, 2024

(54) METHOD OF PRODUCING LITHIUM-ION SECONDARY BATTERY, LITHIUM-ION SECONDARY BATTERY, AND METHOD OF USING ZWITTERIONIC COMPOUND

(71) Applicants: TOYOTA JIDOSHA KABUSHIKI KAISHA, Toyota (JP); SOPHIA SCHOOL CORPORATION, Tokyo (JP)

(72) Inventors: Shinobu Okayama, Miyoshi (JP); Hiroyuki Yamaguchi, Susono (JP); Kyoko Kikuchi, Okazaki (JP); Masahiro Fujita, Kokubunji (JP)

(73) Assignees: TOYOTA JIDOSHA KABUSHIKI KAISHA, Toyota (JP); SOPHIA SCHOOL CORPORATION, Tokyo (JP)

( * ) Notice: Subject to any disclaimer, the term of this patent is extended or adjusted under 35 U.S.C. 154(b) by 325 days.

(21) Appl. No.: 16/175,995

(22) Filed: Oct. 31, 2018

(65) Prior Publication Data
US 2019/0131656 A1    May 2, 2019

(30) Foreign Application Priority Data

Oct. 31, 2017    (JP) ................................. 2017-210787

(51) Int. Cl.
*H01M 10/0567* (2010.01)
*H01M 4/02* (2006.01)
(Continued)

(52) U.S. Cl.
CPC ......... *H01M 10/0567* (2013.01); *H01M 4/13* (2013.01); *H01M 4/366* (2013.01);
(Continued)

(58) Field of Classification Search
CPC ........ H01M 10/0567; H01M 10/0525; H01M 10/056; H01M 10/4235; H01M 10/54;
(Continued)

(56) References Cited

U.S. PATENT DOCUMENTS

2002/0009635 A1*   1/2002   Michot ................. C07C 211/63
                                                                    429/188
2007/0212615 A1    9/2007   Jost et al.
(Continued)

FOREIGN PATENT DOCUMENTS

AU    2004240178 A1 *   3/2006   ........ H01M 10/0568
CN    1973397 A       5/2007
(Continued)

OTHER PUBLICATIONS

JP 2003346897 English machine translation (Year: 2020).*
WO 2016027788 English machine translation (Year: 2020).*

*Primary Examiner* — Ula C Ruddock
*Assistant Examiner* — Armindo Carvalho, Jr.
(74) *Attorney, Agent, or Firm* — Sughrue Mion, PLLC

(57) ABSTRACT

A method of producing a lithium-ion secondary battery includes the following ($\alpha$) and ($\beta$): ($\alpha$) preparing a lithium-ion secondary battery, the lithium-ion secondary battery including at least a positive electrode, a negative electrode, and an electrolyte solution; and ($\beta$) adding a zwitterionic compound to the electrolyte solution. The negative electrode includes at least a negative electrode active material and a film. The film is formed on a surface of the negative electrode active material. The film contains a lithium compound. The zwitterionic compound contains a phosphonium cation or an ammonium cation and a carboxylate anion in one molecule.

19 Claims, 5 Drawing Sheets

(51) Int. Cl.
*H01M 4/13* (2010.01)
*H01M 4/36* (2006.01)
*H01M 10/0525* (2010.01)
*H01M 10/056* (2010.01)
*H01M 10/42* (2006.01)
*H01M 10/54* (2006.01)

(52) U.S. Cl.
CPC ..... *H01M 10/0525* (2013.01); *H01M 10/056* (2013.01); *H01M 10/4235* (2013.01); *H01M 10/54* (2013.01); *H01M 2004/027* (2013.01); *H01M 2220/20* (2013.01); *H01M 2300/0025* (2013.01)

(58) Field of Classification Search
CPC .. H01M 4/13; H01M 4/366; H01M 2004/027; H01M 220/20; H01M 2300/0025; H01M 4/36; H01M 4/38; H01M 10/4242
See application file for complete search history.

(56) References Cited

U.S. PATENT DOCUMENTS

| | | | |
|---|---|---|---|
| 2010/0068605 A1* | 3/2010 | Harris | H01M 10/4242 |
| | | | 429/47 |
| 2014/0087248 A1* | 3/2014 | Tachibana | H01M 10/0567 |
| | | | 429/188 |
| 2017/0040651 A1 | 2/2017 | Okayama et al. | |
| 2017/0288268 A1* | 10/2017 | Kim | H01M 10/052 |

FOREIGN PATENT DOCUMENTS

| | | | | |
|---|---|---|---|---|
| JP | 63-26951 A | | 2/1988 | |
| JP | 11-111267 A | | 4/1999 | |
| JP | 2003-346897 A | | 12/2003 | |
| JP | 2003346897 A | * | 12/2003 | |
| JP | 2017-033825 A | | 2/2017 | |
| WO | 2015/199100 A1 | | 12/2015 | |
| WO | 2016/027788 A1 | | 2/2016 | |
| WO | WO-2016027788 A1 | * | 2/2016 | ........ H01M 10/0565 |

* cited by examiner

METHOD OF PRODUCING LITHIUM-ION SECONDARY BATTERY, LITHIUM-ION SECONDARY BATTERY, AND METHOD OF USING ZWITTERIONIC COMPOUND

This nonprovisional application is based on Japanese Patent Application No. 2017-210787 filed on Oct. 31, 2017 with the Japan Patent Office, the entire contents of which are hereby incorporated by reference.

BACKGROUND

Field

The present disclosure relates to a method of producing a lithium-ion secondary battery, a lithium-ion secondary battery, and a capacity-restoring agent for a lithium-ion secondary battery.

Description of the Background Art

Japanese Patent Laying-Open No. 2017-33825 discloses use of ultrasonic vibration for reducing resistance in a lithium-ion secondary battery the capacity of which has deteriorated.

SUMMARY

Lithium-ion secondary batteries gradually lose capacity during repeated charge and discharge. One of the factors for this loss of capacity is considered to be a film that is formed on the surface of the negative electrode active material. It is considered that the film is formed as a result of reduction and degradation of the electrolyte solution. The film is also called solid electrolyte interface (SEI). It is considered that the film contains a lithium (Li) compound, such as LiF. It is considered that Li ions contained in the Li compound do not contribute to charge-discharge reaction. It is therefore considered that as the film becomes thicker, the number of Li ions capable of contributing to charge-discharge reaction decreases and, consequently, the capacity decreases.

An object of the present disclosure is to provide a lithium-ion secondary battery having a restorable capacity.

In the following, the technical structure and the effects according to the present disclosure are described. It should be noted that part of the action mechanism according to the present disclosure is based on presumption. Therefore, the scope of claims should not be limited by whether or not the action mechanism is correct.

[1] A method of producing a lithium-ion secondary battery includes the following ($\alpha$) and ($\beta$):

($\alpha$) preparing a lithium-ion secondary battery, the lithium-ion secondary battery including at least a positive electrode, a negative electrode, and an electrolyte solution; and ($\beta$) adding a zwitterionic compound to the electrolyte solution.

The negative electrode includes at least a negative electrode active material and a film. The film is formed on a surface of the negative electrode active material. The film contains a lithium compound.

The zwitterionic compound contains a phosphonium cation or an ammonium cation and a carboxylate anion in one molecule.

The production method according to [1] above can provide a lithium-ion secondary battery having a restorable capacity. The zwitterionic compound is considered to contribute to dissolution reaction of the Li compound contained in the film, based on a mechanism the details of which are unknown. It is considered that dissolution of the Li compound releases Li ions, which can contribute to charge-discharge reaction.

[2] In the method of producing a lithium-ion secondary battery according to [1] above, the zwitterionic compound may contain a phosphonium cation and a carboxylate anion in one molecule.

[3] A lithium-ion secondary battery includes at least a positive electrode, a negative electrode, and an electrolyte solution. The negative electrode includes at least a negative electrode active material and a film. The film is formed on a surface of the negative electrode active material. The film contains a lithium compound. The electrolyte solution contains at least a zwitterionic compound. The zwitterionic compound contains a phosphonium cation or an ammonium cation and a carboxylate anion in one molecule.

When the electrolyte solution contains the zwitterionic compound, the capacity of the resulting lithium-ion secondary battery is restorable. With the capacity thus being restorable, the lithium-ion secondary battery is expected to have a long service life. With the zwitterionic compound thus being contained in the electrolyte solution, it is expected that the amount of the film to be formed decreases. With the amount of the film thus being decreased, it is expected that, among others, resistance is reduced and more specifically input-output characteristics improve.

[4] In the lithium-ion secondary battery according to [3] above, the zwitterionic compound may contain a phosphonium cation and a carboxylate anion in one molecule.

[5] A capacity-restoring agent for a lithium-ion secondary battery contains at least a zwitterionic compound. The zwitterionic compound contains a phosphonium cation or an ammonium cation and a carboxylate anion in one molecule.

It is expected that addition of the capacity-restoring agent for a lithium-ion secondary battery according to [5] above to, for example, an electrolyte solution makes the capacity of the lithium-ion secondary battery be restorable.

[6] In the capacity-restoring agent for a lithium-ion secondary battery according to [5] above, the zwitterionic compound may contain a phosphonium cation and a carboxylate anion in one molecule.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments according to the present disclosure (herein called "present embodiment") are described. The scope of claims is not limited to the following description. Hereinafter, a lithium-ion secondary battery is also simply referred to as "battery".

<Method of Producing Lithium-Ion Secondary Battery>

The present embodiment provides a method of producing a lithium-ion secondary battery.

Figure 1:
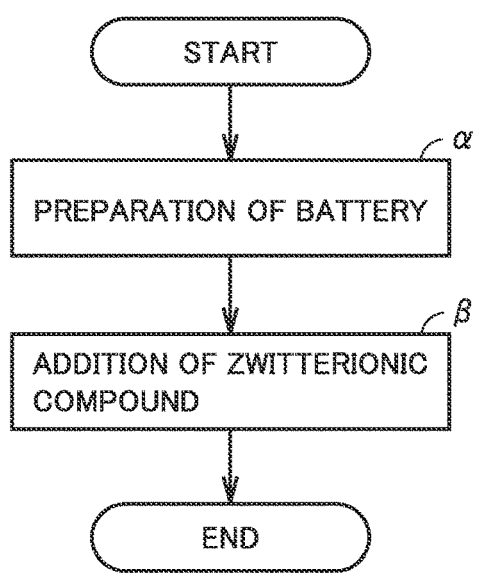
FIG. 1 is a flow chart schematically showing the method of producing a lithium-ion secondary battery according to the present embodiment.

FIG. 1 is a flow chart schematically showing the method of producing a lithium-ion secondary battery according to the present embodiment. The production method according to the present embodiment includes "(α) preparation of a battery" and "(β) addition of a zwitterionic compound".

<(α) Preparation of Battery>

The production method according to the present embodiment includes preparing a lithium-ion secondary battery. The preparation of the battery may be carried out by producing a new battery or by collecting a used battery.

<<Battery>>

Figure 2:
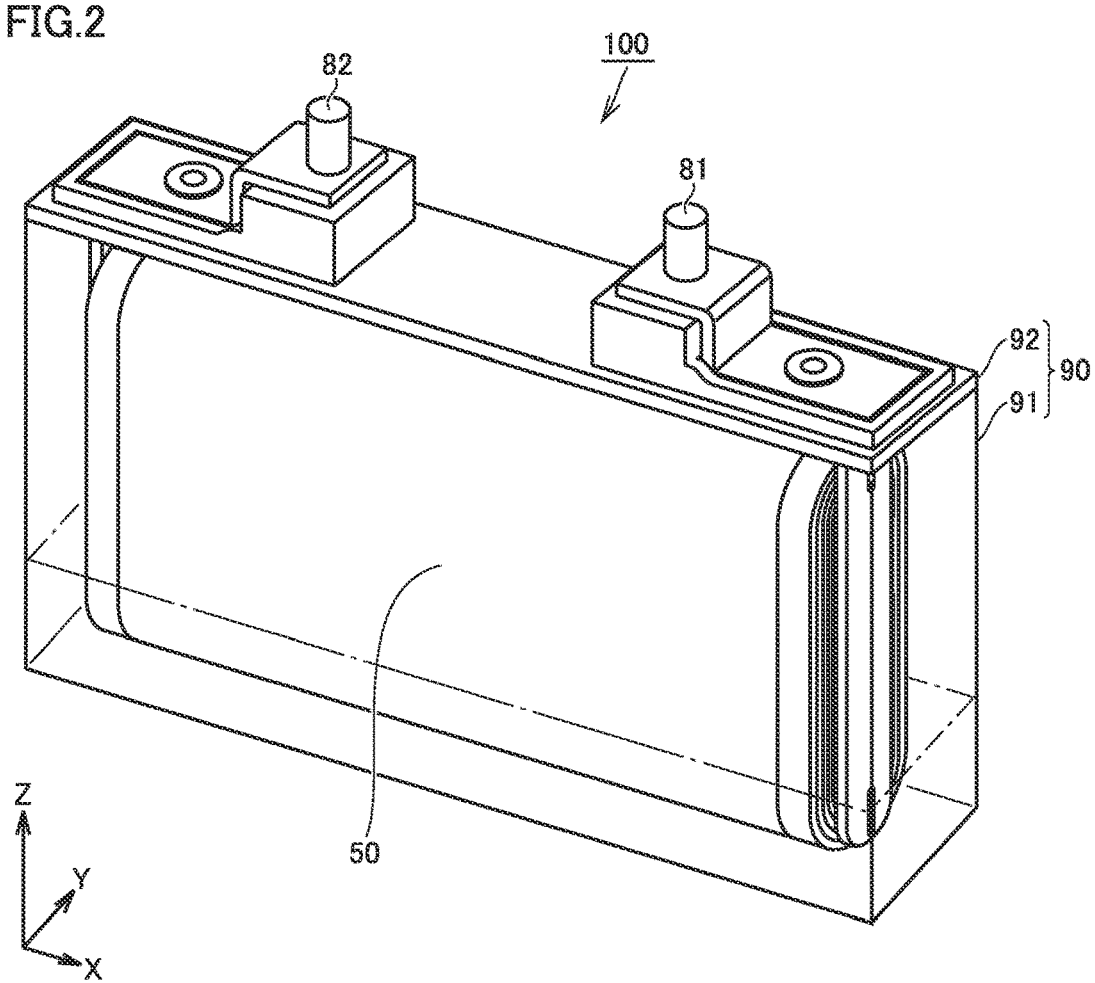
FIG. 2 is a schematic view illustrating the structure of the lithium-ion secondary battery.

FIG. 2 is a schematic view illustrating the structure of the lithium-ion secondary battery. A battery 100 includes a casing 90. Casing 90 is prismatic (a flat, rectangular parallelepiped). The shape of the casing is not limited to prismatic. The casing may be cylindrical, for example. Casing 90 includes a container 91 and a cap 92. Cap 92 is bonded to container 91 by, for example, laser beam welding. Cap 92 is equipped with a positive electrode terminal 81 and a negative electrode terminal 82. Cap 92 may be further equipped with a liquid inlet, a gas-discharge valve, and a current interrupt device (CID), for example.

Casing 90 accommodates an electrode array 50 and an electrolyte solution. In FIG. 2, the alternate long and short dash line shows the liquid level of the electrolyte solution. Part of the electrolyte solution is present inside electrode array 50. Casing 90 is hermetically sealed. Casing 90 may be made of aluminum (Al) alloy, for example. As long as a predetermined extent of hermetical sealing can be ensured, the casing may be, for example, a pouch made of an aluminum-laminated film or the like. In other words, the battery may be a laminate-type battery.

Figure 3:
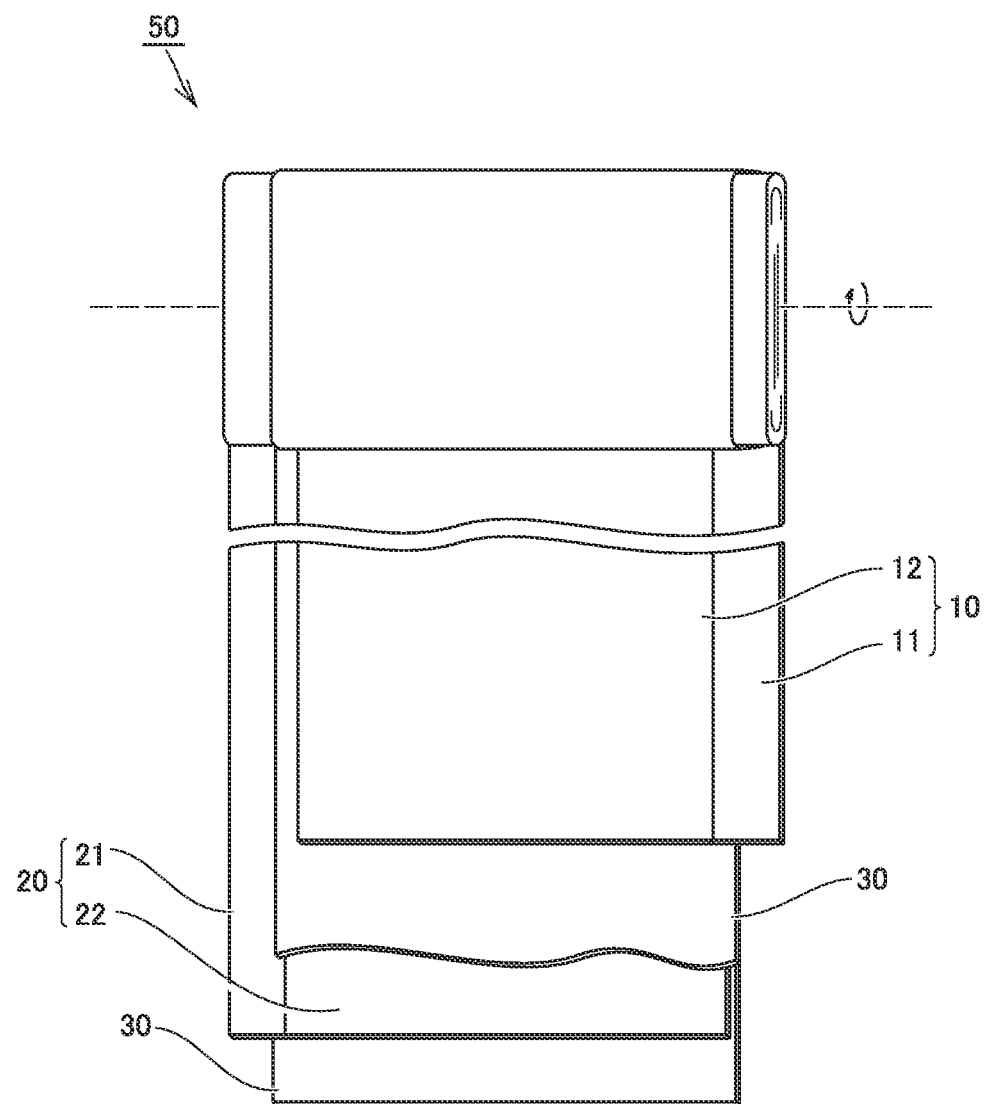
FIG. 3 is a schematic view illustrating the structure of an electrode array.

FIG. 3 is a schematic view illustrating the structure of the electrode array. Electrode array 50 is a wound-type one, for example. Electrode array 50 is formed by stacking a positive electrode 10, one separator 30, a negative electrode 20, and another separator 30 in this order and then winding them in a spiral fashion. In other words, battery 100 includes at least positive electrode 10, negative electrode 20, and the electrolyte solution. Positive electrode 10 is electrically connected to positive electrode terminal 81 (FIG. 2). Negative electrode 20 is electrically connected to negative electrode terminal 82 (FIG. 2).

The electrode array may be a stack-type one, for example. A stack-type electrode array may be formed by, for example, alternately stacking a positive electrode and a negative electrode with a separator interposed between the positive electrode and the negative electrode.

(Positive Electrode)

Positive electrode 10 is a belt-shaped sheet, for example. Positive electrode 10 may be produced by, for example, coating a surface of a positive electrode current collector 11 with a positive electrode composite material 12. Positive electrode current collector 11 may be made of Al foil, for example. Positive electrode composite material 12 contains, for example, a positive electrode active material in an amount of 80 to 98 mass %, a conductive material (such as acetylene black) in an amount of 1 to 10 mass %, and a binder (such as polyvinylidene difluoride) in an amount of 1 to 10 mass %. In other words, positive electrode 10 includes at least the positive electrode active material. The positive electrode active material is not particularly limited. The positive electrode active material may be $LiCoO_2$, $LiNiO_2$, $LiMnO_2$, $LiMn_2O_4$, $LiNi_{1/3}Co_{1/3}Mn_{1/3}O_2$, and/or $LiFePO_4$, for example. One type of the positive electrode active material may be used alone. Two or more types of the positive electrode active material may be used in combination.

(Negative Electrode)

Negative electrode 20 is a belt-shaped sheet, for example. Negative electrode 20 may be produced by, for example, coating a surface of a negative electrode current collector 21 with a negative electrode composite material 22. Negative electrode current collector 21 may be made of copper (Cu) foil, for example. Negative electrode composite material 22 contains at least a negative electrode active material. Negative electrode composite material 22 contains the negative electrode active material in an amount of 80 to 99.5 mass % and a binder (such as carboxymethylcellulose and/or styrene-butadiene rubber) in an amount of 0.5 to 20 mass %, for example. The negative electrode active material is not particularly limited. The negative electrode active material may be graphite, soft carbon, hard carbon, silicon (Si), silicon monoxide (SiO), silicon-based alloy, tin (Sn), tin oxide ($SnO_2$), and/or tin-based alloy, for example. One type of the negative electrode active material may be used alone. Two or more types of the negative electrode active material may be used in combination.

In the present embodiment, negative electrode composite material 22 further contains a film. In other words, negative electrode 20 includes at least the negative electrode active material and the film. The film is formed on a surface of the negative electrode active material. It is considered that the film is formed, for example, during production of battery 100 (for example, during initial charge and/or during aging). It is also considered that the film is formed, for example, during use of battery 100 (for example, during charge).

It is considered that the film is formed as a result of reduction and degradation of the electrolyte solution. The film contains a Li compound. The Li compound may be, for example, LiF, $Li_2CO_3$, $Li_2O$, and/or $LiCO_2R$ (R represents an alkyl group, for example). It is considered that Li ions contained in the Li compound do not contribute to charge-discharge reaction. In other words, formation of a thick film is considered to lead to capacity loss. The formation of a thick film is also considered to lead to an increase in resistance. The reason why it is thus considered is because the film inhibits the movement of Li ions. In the present embodiment, a zwitterionic compound described below is expected to cause Li ions to be released from the film, in other words, expected to lead to capacity restoration. The zwitterionic compound is also expected to lead to a decrease in the amount of the film to be formed, in other words, expected to lead to a reduction in resistance.

(Separator)

The separator is a belt-shaped sheet, for example. The separator is porous. The separator may be made of insulating material. The separator may be made of polyethylene (PE) and/or polypropylene (PP), for example.

(Electrolyte Solution)

The electrolyte solution contains a solvent and a Li salt. The solvent is aprotic. The solvent may be a mixture of a cyclic carbonate and a chain carbonate, for example. The mixing ratio may be "(cyclic carbonate):(chain carbonate) =1:9 to 5:5" (volume ratio), for example. The cyclic carbonate may be ethylene carbonate (EC) and/or propylene carbonate (PC), for example. One type of the cyclic carbonate may be used alone. Two or more types of the cyclic carbonate may be used in combination. The chain carbonate may be dimethyl carbonate (DMC), ethyl methyl carbonate (EMC), and/or diethyl carbonate (DEC), for example. One type of the chain carbonate may be used alone. Two or more types of the chain carbonate may be used in combination.

The Li salt is a supporting electrolyte. In the electrolyte solution, the Li salt may be contained in an amount of 0.5 to 2 mol/l, for example. The Li salt may be LiPF$_6$, LiBF$_4$, Li[N(FSO$_2$)$_2$], and/or Li[N(CF$_3$SO$_2$)$_2$], for example. One type of the Li salt may be used alone. Two or more types of the Li salt may be used in combination.

The electrolyte solution may further contain various additives. The electrolyte solution may contain the additives in an amount of 0.01 to 0.1 mol/l, for example. The additives may be vinylene carbonate (VC), propane sultone (PS), cyclohexylbenzene (CHB), biphenyl (BP), and/or lithium bis(oxalato)borate (LiBOB), for example. One type of the additives may be used alone. Two or more types of the additives may be used in combination.

<(β) Addition of Zwitterionic Compound>

The production method according to the present embodiment includes adding a zwitterionic compound to the electrolyte solution. For example, the zwitterionic compound in powder form may be added to the electrolyte solution. Alternatively, a solution containing the zwitterionic compound may be mixed with the electrolyte solution.

Addition of the zwitterionic compound to the electrolyte solution is expected to cause dissolution of the Li compound that is contained in the film (namely, release of Li ions). In other words, by this addition, the resulting battery can attain a restorable capacity. As a result of dissolution of the film, resistance is expected to be reduced. Therefore, in the case in which battery 100 is a used battery, the addition of the zwitterionic compound makes it possible to recycle the used battery into a battery having a restorable capacity.

In the present embodiment, it is considered that the dissolution reaction of the Li compound proceeds under an environment at normal temperature (10 to 30° C.), for example. Therefore, no special process is required after the addition of the zwitterionic compound. For the purpose of promoting the dissolution reaction, battery 100 may be stored under a high-temperature environment. Desirably, the temperature during storage and the duration of storage are adjusted so that the degradation reaction of the electrolyte solution, among others, is less likely to proceed. The temperature during storage may be 30 to 60° C., for example. The duration of storage may be 1 to 50 hours, for example.

The amount of the zwitterionic compound added is not particularly limited. The amount of the zwitterionic compound added may be changed as appropriate according to, for example, the specification of battery 100 and the extent of capacity loss in battery 100. When the amount of the zwitterionic compound added is excessively large, the viscosity of the electrolyte solution can increase. The amount of the zwitterionic compound in the electrolyte solution may be, for example, 0.001 to 0.1 mol/l. The amount of the zwitterionic compound in the electrolyte solution may be, for example, 0.01 to 0.1 mol/l. When the electrolyte solution contains various additives, the total amount of the various additives and the zwitterionic compound may be set at not higher than 0.1 mol/l.

In the case in which a solution containing the zwitterionic compound is used, it is desirable that the composition of the solution from which the zwitterionic compound is subtracted be similar to the composition of the electrolyte solution. The composition of the solution containing the zwitterionic compound from which the zwitterionic compound is subtracted may be substantially the same as the composition of the electrolyte solution. In this aspect, the change in the composition of the electrolyte solution that occurs as a result of the addition of the zwitterionic compound may be reduced.

The zwitterionic compound according to the present embodiment contains a phosphonium cation or an ammonium cation and a carboxylate anion in one molecule. Herein, the phosphonium cation collectively refers to primary to quaternary phosphonium cations, and the ammonium cation collectively refers to primary to quaternary ammonium cations. The zwitterionic compound according to the present embodiment may be represented by, for example, the following formula (I):

where X represents a phosphorus atom (P) or a nitrogen atom (N); R$^1$ represents a C$_{1-10}$ alkylene group, a C$_{1-10}$ substituent containing an ether bond, or an aryl group; each of R$^2$, R$^3$, and R$^4$ independently represents a hydrogen atom, a C$_{1-10}$ alkyl group, a C$_{1-10}$ substituent containing an ether bond, or an aryl group; and two or more of R$^1$, R$^2$, R$^3$, and R$^4$ may be bonded to each other and form a ring compound together with X.

The alkylene group may be linear. The alkylene group may be a methylene group, an ethylene group, an n-propylene group, an n-butylene group, an n-hexylene group, an n-heptylene group, an n-octylene group, and/or an n-dodecylene group, for example. The alkylene group may be branched. The alkylene group may be a propane-1,2-diyl group and/or a butane-1,3-diyl group, for example.

The alkyl group may be linear. The alkyl group may be a methyl group, an ethyl group, an n-propyl group, an n-butyl group, and/or an n-pentyl group, for example. The alkyl group may be branched. The alkyl group may be an isopropyl group, an s-butyl group, an isobutyl group, and/or a t-butyl group, for example.

The aryl group may have no substituent. The aryl group may be a phenyl group, a 1-naphthyl group, and/or a 2-naphthyl group, for example. The aryl group may have a substituent. A substituent of the aryl group may be a methyl group, an ethyl group, a methoxy group, and/or an ethoxy group, for example.

The ring compound that may be formed by two or more groups among R$^1$, R$^2$, R$^3$, and R$^4$ together with X in the formula (I) above may be pyrrolidinium, piperidinium, and/or morpholinium, for example. Herein, N$^+$ contained in the ring compound is also regarded as an ammonium cation.

The zwitterionic compound according to the present embodiment may also be represented by, for example, the following formula (II):

where X represents P or N; $R^5$ represents a $C_{1-8}$ alkylene group; and each of $R^6$, $R^7$, and $R^8$ independently represents a $C_{1-8}$ alkyl group.

The zwitterionic compound according to the present embodiment may also be represented by, for example, the following formula (III):

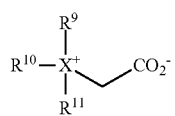
(III)

where X represents P or N; and each of $R^9$, $R^{10}$ and $R^{11}$ independently represents a $C_{1-6}$ alkyl group. It is expected that as the number of carbon atoms of a substituent decreases, solubility of the zwitterionic compound in the electrolyte solution improves, among others.

The zwitterionic compound may also be a compound represented by the following formula (IV), for example. In other words, the zwitterionic compound may contain a phosphonium cation and a carboxylate anion in one molecule.

$(CH_3CH_2CH_2CH_2)_3P^+CH_2CO_2^-$ (IV)

The zwitterionic compound may be a compound represented by the following formula (V), for example. In other words, the zwitterionic compound may contain an ammonium cation and a carboxylate anion in one molecule.

$(CH_3CH_2CH_2CH_2)_3N^+CH_2CO_2^-$ (V)

One type of the zwitterionic compound may be used alone. Two or more types of the zwitterionic compound may be used in combination.

<Lithium-Ion Secondary Battery>

The present embodiment also provides a lithium-ion secondary battery.

More specifically, the battery according to the present embodiment includes at least a positive electrode, a negative electrode, and an electrolyte solution. The negative electrode includes at least a negative electrode active material and a film. The film is formed on a surface of the negative electrode active material. The film contains a Li compound. The electrolyte solution contains at least a zwitterionic compound. The zwitterionic compound contains a phosphonium cation or an ammonium cation and a carboxylate anion in one molecule.

The zwitterionic compound, for example, is described above in detail. The zwitterionic compound in the battery according to the present embodiment may contain a phosphonium cation and a carboxylate anion in one molecule.

It is expected that the battery according to the present embodiment is a battery having a restorable capacity. Therefore, it is expected that the battery according to the present embodiment has a long service life. With the zwitterionic compound thus being contained in the electrolyte solution, it is expected that the amount of the film to be formed decreases. With the amount of the film thus being decreased, it is expected that input-output characteristics improve, among others.

The battery according to the present embodiment is expected to have a long service life and excellent input-output characteristics. Examples of the use of the battery according to the present embodiment where a long service life and excellent input-output characteristics are required include power supplies for driving, for example, hybrid vehicles (HVs), plug-in hybrid vehicles (PHVs), and electric vehicles (EVs). It should be noted that the use of the battery according to the present embodiment is not limited to vehicle-mounted applications. The battery according to the present embodiment may be used in any application.

<Capacity-Restoring Agent for Lithium-Ion Secondary Battery>

The present embodiment also provides a capacity-restoring agent for a lithium-ion secondary battery.

More specifically, the capacity-restoring agent according to the present embodiment contains at least a zwitterionic compound. The zwitterionic compound contains a phosphonium cation or an ammonium cation and a carboxylate anion in one molecule.

The present embodiment also provides a method of using a zwitterionic compound.

More specifically, the method of using a zwitterionic compound according to the present embodiment includes (i) preparing a zwitterionic compound and (ii) restoring capacity of a battery by using the zwitterionic compound.

The zwitterionic compound is described above in detail. The zwitterionic compound in the capacity-restoring agent according to the present embodiment may contain a phosphonium cation and a carboxylate anion in one molecule.

The capacity-restoring agent according to the present embodiment may be solid. The capacity-restoring agent may be, for example, the zwitterionic compound in powder form. The zwitterionic compound may be in granular form.

The capacity-restoring agent according to the present embodiment may further contain a component other than the zwitterionic compound. The capacity-restoring agent according to the present embodiment may be in the form of particle dispersion, for example. The particle dispersion contains the zwitterionic compound and a solvent. The particle dispersion may be prepared by, for example, dispersing the zwitterionic compound in powder form in the solvent. The capacity-restoring agent according to the present embodiment may be in solution form. The solution contains the zwitterionic compound and a solvent. The solution may be prepared by, for example, dissolving the zwitterionic compound in the solvent. The solvent may be, for example, a solvent described above as an example of the solvent of the electrolyte solution. The solution may further contain a Li salt, for example.

Examples

In the following, examples according to the present disclosure are described. The scope of claims is not limited to the following description.

<(α) Preparation of Battery>

A used battery was prepared. The capacity of the used battery was lower than the initial capacity by 11.4%. The used battery was disassembled, and thus a used positive electrode and a used negative electrode were obtained. The used negative electrode contained graphite as a negative electrode active material. A surface of the negative electrode active material had a film formed thereon. More specifically, the used negative electrode included at least the negative electrode active material and the film. It is considered that the film contained a Li compound. It is considered that the Li compound was formed as a result of reduction and degradation of the electrolyte solution of the used battery.

The used positive electrode and the used negative electrode were cut into pieces of a predetermined size. Thus, a plurality of test positive electrodes and a plurality of test negative electrodes were prepared.

These test positive electrodes and test negative electrodes were used, and three electrode arrays were formed. Each electrode array was placed in a predetermined casing. Into the casing, an electrolyte solution was injected. The electrolyte solution had the following composition.

Li salt: LiPF$_6$, 1.1 mol/l
Solvent: [EC:EMC:DMC=3:3:4 (volume ratio)]

After the injection of the electrolyte solution, the casing was hermetically sealed. Thus, batteries Nos. 1 to 3 were prepared. The amount of the electrolyte solution used in this experiment was half a standard amount. The standard amount refers to the amount of the electrolyte solution typically required for the electrode array in this experiment. The initial capacity of each battery was measured under an environment at 25° C. All the batteries had substantially the same initial capacity.

Under the environment at 25° C., the initial reaction resistance (25° C.) of each battery was measured by an AC impedance method. The "reaction resistance (25° C.)" in this experiment refers to the real part of impedance on a Nyquist plot (also called Cole-Cole plot) at 1 Hz. All the batteries had substantially the same initial reaction resistance (25° C.).

Under an environment at −30° C., the initial reaction resistance (−30° C.) of each battery was measured by an AC impedance method. The "reaction resistance (−30° C.)" in this experiment refers to the real part of impedance on a Nyquist plot at 0.01 Hz. All the batteries had substantially the same initial reaction resistance (−30° C.).

<(β) Addition of Zwitterionic Compound>

An electrolyte solution containing no zwitterionic compound was prepared. In this experiment, this electrolyte solution is called "blank sample solution". The blank sample solution contained the following components.

<<Blank Sample Solution>>
Li salt: LiPF$_6$, 1.1 mol/l
Solvent: [EC:EMC:DMC=3:3:4 (volume ratio)]

A zwitterionic compound of the following formula (VI) was prepared.

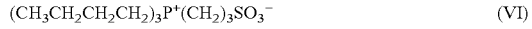

(CH$_3$CH$_2$CH$_2$CH$_2$)$_3$P$^+$(CH$_2$)$_3$SO$_3^-$     (VI)

The zwitterionic compound contained a phosphonium cation and a sulfonate anion in one molecule. In this experiment, the zwitterionic compound of the above formula (VI) is referred to as "TBP$^+$SO$_3^-$".

The TBP$^+$SO$_3^-$ was dissolved in the blank sample solution, and thus a "TBP$^+$SO$_3^-$ sample solution" was prepared. The TBP$^+$SO$_3^-$ sample solution contained the following components.

<<TBP$^+$SO$_3^-$ Sample Solution>>
Zwitterionic compound: TBP$^+$SO$_3^-$, 0.05 mol/l
Li salt: LiPF$_6$, 1.1 mol/l
Solvent: [EC:EMC:DMC=3:3:4 (volume ratio)]

A zwitterionic compound represented by the above formula (IV) was prepared. The zwitterionic compound contained a phosphonium cation and a carboxylate anion in one molecule. In this experiment, the zwitterionic compound represented by the above formula (IV) is referred to as "TBP$^+$CO$_2^-$".

The TBP$^+$CO$_2^-$ was dissolved in the blank sample solution, and thus a "TBP$^+$CO$_2^-$ sample solution" was prepared. The TBP$^+$CO$_2^-$ sample solution contained the following components.

<<TBP$^+$CO$_2^-$ Sample Solution>>
Zwitterionic compound: TBP$^+$CO$_2^-$, 0.05 mol/l
Li salt: LiPF$_6$, 1.1 mol/l
Solvent: [EC:EMC:DMC=3:3:4 (volume ratio)]

<<Rate of Change Involved in Restoration>>

The blank sample solution in an amount half the standard amount was added to battery No. 1.

The TBP$^+$SO$_3^-$ sample solution in an amount half the standard amount was added to battery No. 2.

The TBP$^+$CO$_2^-$ sample solution in an amount half the standard amount was added to battery No. 3.

In other words, the electrolyte solution of each of battery No. 2 and battery No. 3 contained the zwitterionic compound.

After the addition of the sample solution, three cycles of charge and discharge were carried out under an environment at 25° C. (between 0% SOC (state of charge) and 100% SOC). The capacity measured after the third cycle was divided by the initial capacity, and thus a rate of capacity change was calculated. The rate of capacity change of each battery is shown in FIG. 4.

Figure 4:
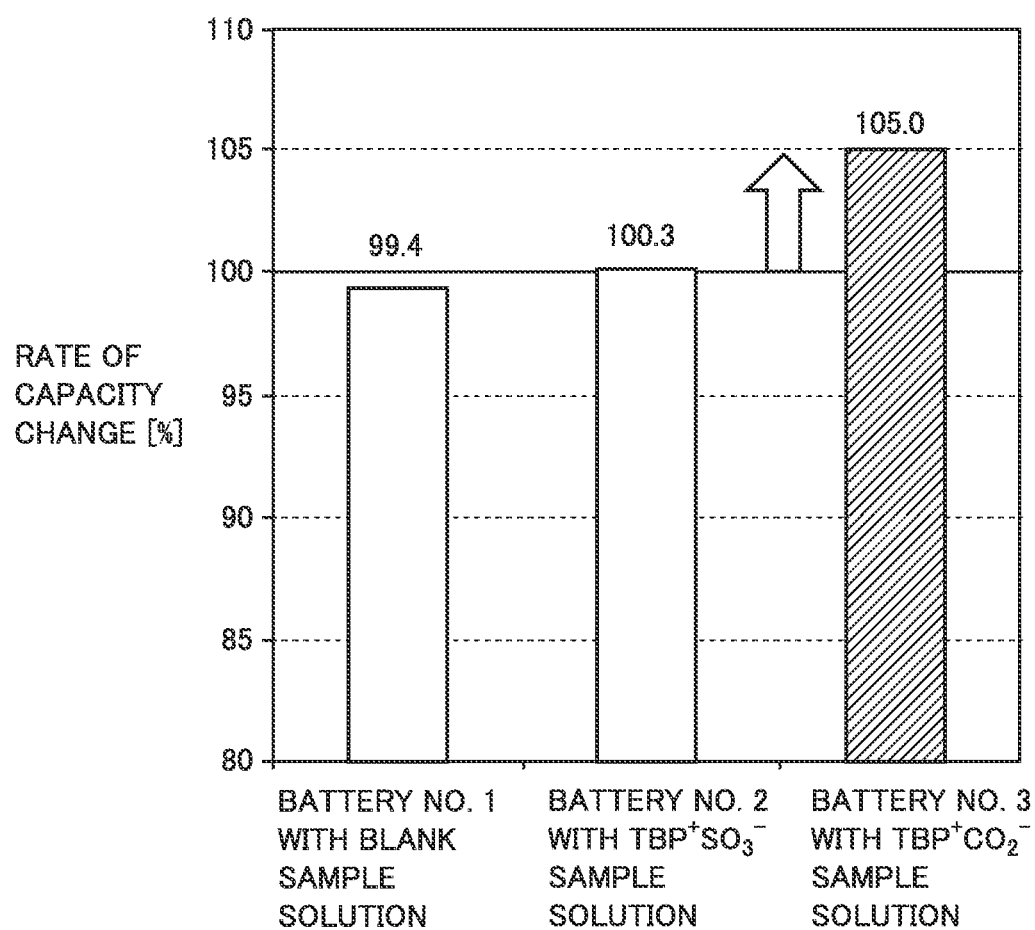
FIG. 4 is a bar chart in which a rate of capacity change is plotted.

FIG. 4 is a bar chart in which the rate of capacity change is plotted. It is considered that a rate of capacity change above 100% means a successful restoration of capacity. Battery No. 3 containing the TBP$^+$CO$_2^-$ sample solution had a 5% restoration of capacity. It is considered that this restoration of capacity occurred as a result of release of Li ions, which can contribute to charge-discharge reaction. In other words, as a result of the addition of TBP$^+$CO$_2^-$ to the electrolyte solution, a battery having a restorable capacity was produced.

No capacity restoration was observed in battery No. 1, to which the blank sample solution was added, or in battery No. 2, to which the TBP$^+$SO$_3^-$ sample solution was added.

<<Rate of Resistance Change (25° C.)>>

After the three cycles, the reaction resistance (25° C.) was measured in the same manner as in the measurement of the initial reaction resistance. The reaction resistance (25° C.) measured after the three cycles was divided by the initial reaction resistance (25° C.), and thus a rate of resistance change (25° C.) was calculated.

Figure 5:
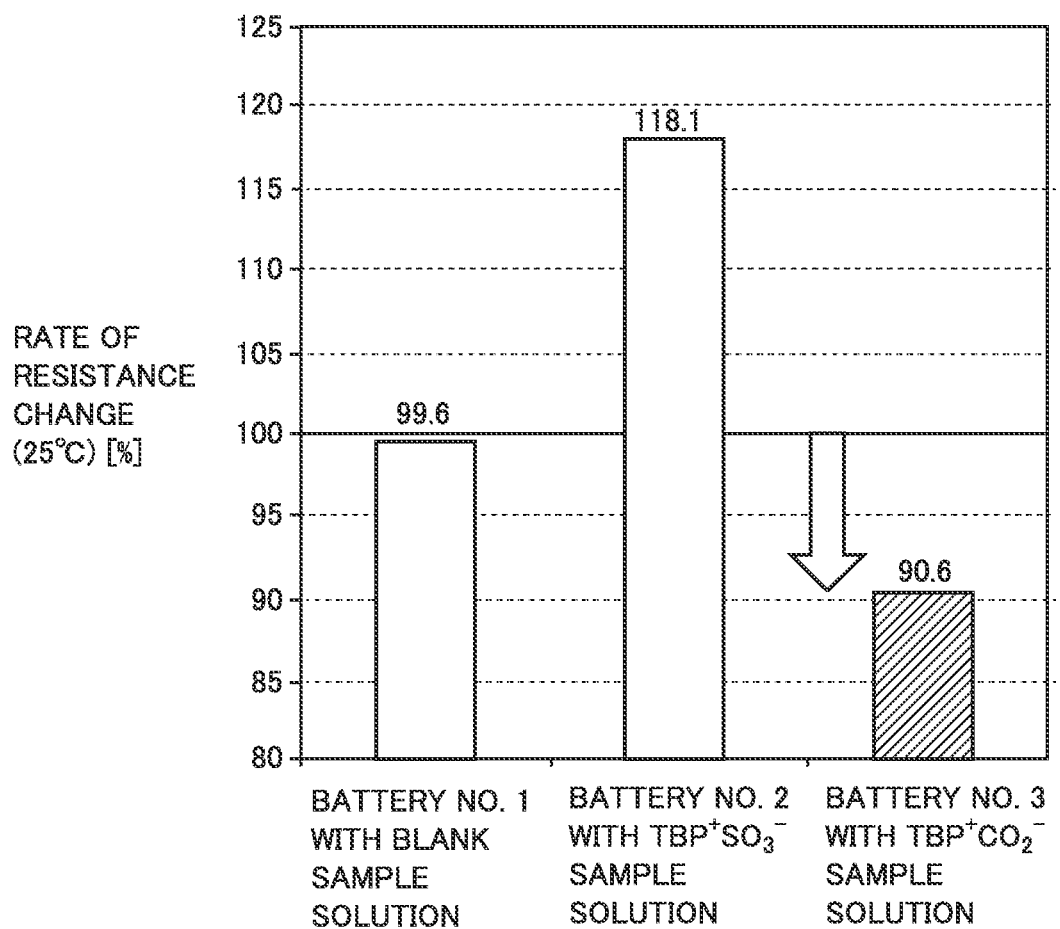
FIG. 5 is a bar chart in which a rate of resistance change (25° C.) is plotted.

FIG. 5 is a bar chart in which the rate of resistance change (25° C.) is plotted. It is considered that a rate of resistance change lower than 100% means a successful reduction in resistance. Battery No. 3, to which the TBP$^+$CO$_2^-$ sample solution was added, had about 9.4% reduction in reaction resistance. It is considered that this reduction in reaction resistance occurred as a result of dissolution of the film, the presence of which leads to an increase in resistance. Battery No. 2, to which the TBP$^+$SO$_3^-$ sample solution was added, had a substantial increase in resistance. Battery No. 1, to which the blank sample solution was added, had no substantial change in resistance.

<<Rate of Resistance Change (−30° C.)>>

After the three cycles, the reaction resistance (−30° C.) was measured in the same manner as in the measurement of the initial reaction resistance. The reaction resistance (−30° C.) measured after the three cycles was divided by the initial reaction resistance (−30° C.), and thus a rate of resistance change (−30° C.) was calculated.

Figure 6:
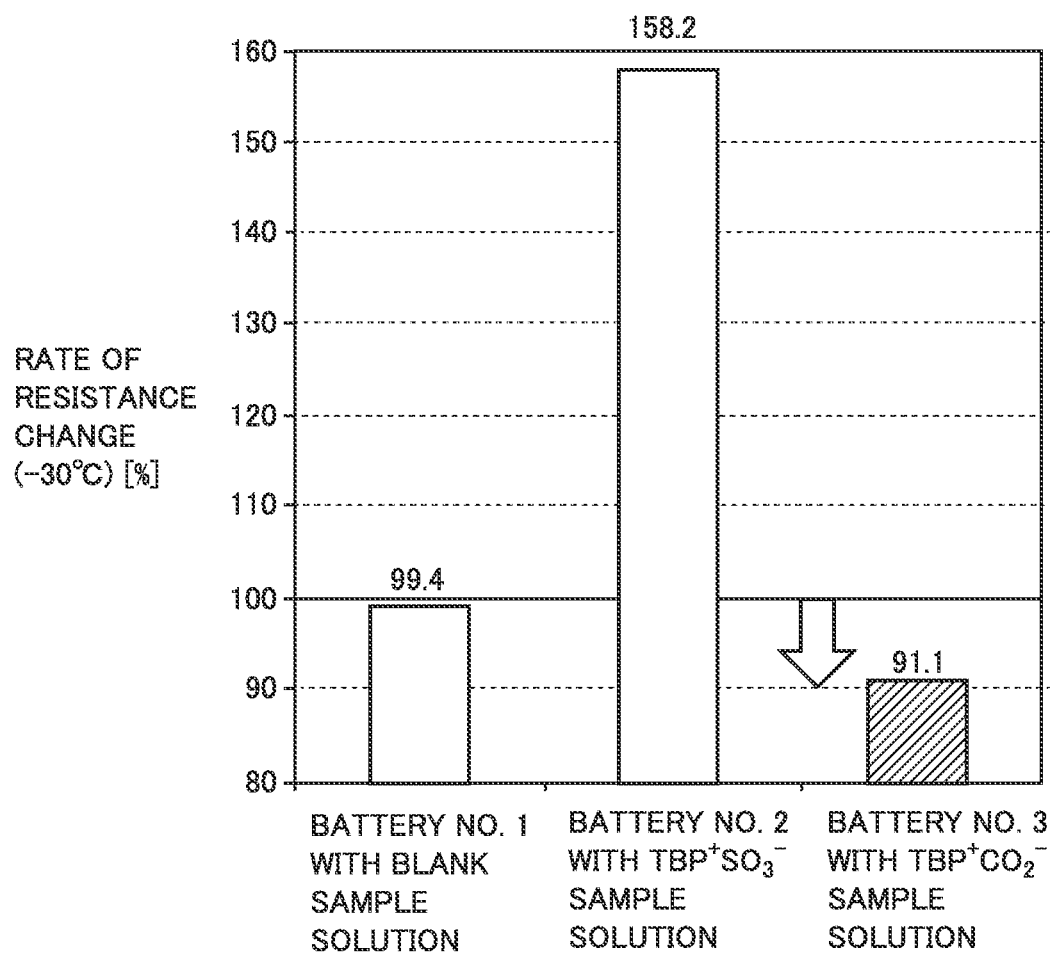
FIG. 6 is a bar chart in which a rate of resistance change (−30° C.) is plotted.

FIG. 6 is a bar chart in which the rate of resistance change (−30° C.) is plotted. It is considered that a rate of resistance change lower than 100% means a successful reduction in resistance. Battery No. 3 containing the TBP$^+$CO$_2^-$ sample solution had a reduction in reaction resistance as in the above measurement at 25° C., and the decrement was about 8.9%. It is considered that this reduction in reaction resistance occurred as a result of dissolution of the film, the presence of which leads to an increase in resistance. Battery No. 2, to which the TBP$^+$SO$_3^-$ sample solution was added, had an increase in resistance greater than the increase at 25° C. Battery No. 1 containing the blank sample solution had no substantial change in resistance.

Battery No. 2, to which the TBP$^+$SO$_3^-$ sample solution was added, was stored at 60° C. The rate of resistance change measured after storage was about 100%, which was lower than the rate of resistance change measured before storage. The rate of resistance change measured after storage did not decrease beyond 100%. No restoration in capacity was observed.

Battery No. 3, to which the TBP$^+$CO$_2^-$ sample solution was added, had restoration in capacity and reduction in resistance both observed at normal temperature. In other words, it is considered that the TBP$^+$CO$_2^-$ sample solution functioned as a capacity-restoring agent.

The embodiments and examples disclosed herein are illustrative and non-restrictive in any respect. The technical scope indicated by the claims is intended to include any modifications within the scope and meaning equivalent to the terms of the claims.

What is claimed is:

1. A method of producing a lithium-ion secondary battery, comprising:
   preparing a lithium-ion secondary battery, the lithium-ion secondary battery comprising at least a positive electrode, a negative electrode, and an electrolyte solution, the electrolyte solution of the prepared lithium-ion secondary battery comprising a solvent and a lithium salt; and
   adding a zwitterionic compound to the electrolyte solution of the prepared lithium-ion secondary battery,
   the negative electrode of the prepared lithium-ion secondary battery including at least a negative electrode active material and a solid electrolyte interface (SEI) film,
   the SEI film being formed on a surface of the negative electrode active material prior to adding the zwitterionic compound to the electrolyte solution,
   the film containing a lithium compound,
   the zwitterionic compound containing a phosphonium cation and a carboxylate anion in one molecule,
   wherein the method includes determining an amount of the zwitterionic compound to be added to the electrolyte solution of the lithium-ion secondary battery a capacity loss of the battery caused by the SEI film.

2. The method of producing a lithium-ion secondary battery according to claim 1, wherein an amount of the zwitterionic compound in the electrolyte solution is 0.01 to 0.1 mol/l.

3. The method of producing a lithium-ion secondary battery according to claim 1, wherein an amount of the lithium salt in the electrolyte solution of the prepared lithium-ion secondary battery is 0.5 to 2 mol/l.

4. The method of producing a lithium-ion secondary battery according to claim 1, wherein an amount of the zwitterionic compound in the electrolyte solution is 0.01 to 0.1 mol/l, and
   an amount of the lithium salt in the electrolyte solution of the prepared lithium-ion secondary battery is 0.5 to 2 mol/l.

5. The method of producing a lithium-ion secondary battery according to claim 1, wherein the zwitterionic compound is represented by the following formula (I):

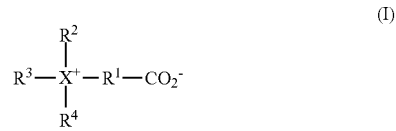

(I)

where X represents a phosphorus atom (P); R$^1$ represents a C$_{1-10}$ alkylene group, a C$_{1-10}$ substituent containing an ether bond, or an aryl group; each of R$^2$, R$^3$, and R$^4$ independently represents a hydrogen atom, a C$_{1-10}$ alkyl group, a C$_{1-10}$ substituent containing an ether bond, or an aryl group; and two or more of R$^1$, R$^2$, R$^3$, and R$^4$ may be bonded to each other and form a ring compound together with X.

6. The method of producing a lithium-ion secondary battery according to claim 1, wherein the zwitterionic compound is be represented by the following formula (II):

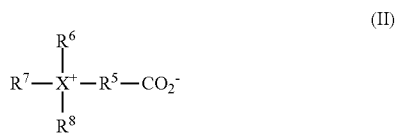

(II)

where X represents P; R$^5$ represents a C$_{1-8}$ alkylene group; and each of R$^6$, R$^7$, and R$^8$ independently represents a C$_{1-8}$ alkyl group.

7. The method of producing a lithium-ion secondary battery according to claim 1, wherein the zwitterionic compound is be represented by the following formula (III):

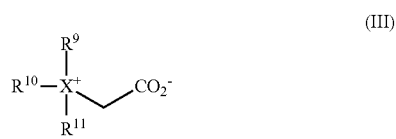

(III)

where X represents P; and each of R$^9$, R$^{10}$ and R$^{11}$ independently represents a C$_{1-6}$ alkyl group.

8. The method of producing a lithium-ion secondary battery according to claim 1, wherein the zwitterionic compound is be represented by the following formula (IV):

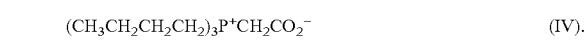

(IV).

9. A lithium-ion secondary battery comprising at least a positive electrode, a negative electrode, and an electrolyte solution,
   the negative electrode including at least a negative electrode active material and a solid electrolyte interface (SEI) film, the SEI film being formed on a surface of the negative electrode active material, the film containing a lithium compound,
   the electrolyte solution containing at least a solvent, a lithium salt, and a zwitterionic compound, the solvent not containing a salt,
   the zwitterionic compound containing a phosphonium cation and a carboxylate anion in one molecule,
   an amount of the zwitterionic compound in the electrolyte solution is 0.01 to 0.1 mol/L.

10. The lithium-ion secondary battery according to claim 9, wherein an amount of the lithium salt in the electrolyte solution is 0.5 to 2 mol/l.

11. The lithium-ion secondary battery according to claim 9,
wherein an amount of the lithium salt in the electrolyte solution is 0.5 to 2 mol/l.

12. A method of using a zwitterionic compound to restore capacity of a lithium-ion secondary battery, comprising:
identifying a battery as having a deteriorated capacity, wherein the battery having the deteriorated capacity comprises at least a positive electrode, a negative electrode, and an electrolyte solution, the electrolyte solution comprising a solvent and a lithium salt, and the negative electrode including at least a negative electrode active material and a solid electrolyte interface (SEI) film formed on a surface of the negative electrode active material;
determining a capacity loss of the battery having the deteriorated capacity;
selecting an amount of a zwitterionic compound to add to the electrolyte solution of the lithium-ion secondary battery having the deteriorated capacity based on the capacity loss;
preparing the zwitterionic compound; and
restoring capacity of the lithium-ion secondary battery having the deteriorated capacity by adding the zwitterionic compound to the electrolyte solution of the lithium-ion secondary battery having the deteriorated capacity and the SEI film on the surface of the negative electrode active material,
wherein the zwitterionic compound contains a phosphonium cation and a carboxylate anion in one molecule, and
the deteriorated capacity represents a capacity being lower than an initial capacity of the lithium-ion secondary battery.

13. The method of using a zwitterionic compound according to claim 12, wherein an amount of the zwitterionic compound in the electrolyte solution is 0.01 to 0.1 mol/l.

14. The method of using a zwitterionic compound according to claim 12, wherein an amount of the lithium salt in the electrolyte solution is 0.5 to 2 mol/l.

15. The method of using a zwitterionic compound according to claim 12, wherein an amount of the zwitterionic compound in the electrolyte solution is 0.01 to 0.1 mol/l, and an amount of the lithium salt in the electrolyte solution is 0.5 to 2 mol/l.

16. The method of using a zwitterionic compound according to claim 12, wherein the zwitterionic compound is be represented by the following formula (I):

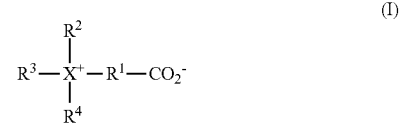

where X represents a phosphorus atom (P); $R^1$ represents a $C_{1-10}$ alkylene group, a $C_{1-10}$ substituent containing an ether bond, or an aryl group; each of $R^2$, $R^3$, and $R^4$ independently represents a hydrogen atom, a $C_{1-10}$ alkyl group, a $C_{1-10}$ substituent containing an ether bond, or an aryl group; and two or more of $R^1$, $R^2$, $R^3$, and $R^4$ may be bonded to each other and form a ring compound together with X.

17. The method of using a zwitterionic compound according to claim 12, wherein the zwitterionic compound is be represented by the following formula (II):

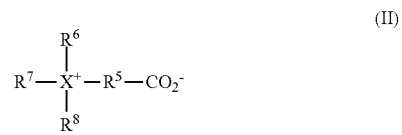

where X represents P; $R^5$ represents a $C_{1-8}$ alkylene group; and each of $R^6$, $R^7$, and $R^8$ independently represents a $C_{1-8}$ alkyl group.

18. The method of using a zwitterionic compound according to claim 12, wherein the zwitterionic compound is be represented by the following formula (III):

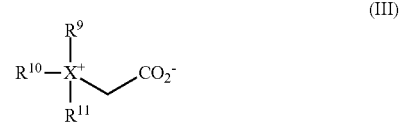

where X represents P; and each of $R^9$, $R^{10}$ and $R^{11}$ independently represents a $C_{1-6}$ alkyl group.

19. The method of using a zwitterionic compound according to claim 12, wherein the zwitterionic compound is be represented by the following formula (IV):

$(CH_3CH_2CH_2CH_2)_3P^*CH_2CO_2^-$     (IV).

* * * * *